(12) United States Patent
Wang

(10) Patent No.: US 11,334,309 B2
(45) Date of Patent: May 17, 2022

(54) IMAGE DISPLAY METHOD, APPARATUS AND COMPUTER READABLE STORAGE MEDIUM

(71) Applicant: BEIJING MICROLIVE VISION TECHNOLOGY CO., LTD, Beijing (CN)

(72) Inventor: Kun Wang, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/018,747

(22) Filed: Sep. 11, 2020

(65) Prior Publication Data

US 2021/0042083 A1    Feb. 11, 2021

Related U.S. Application Data

(63) Continuation of application No. PCT/CN2018/123651, filed on Dec. 25, 2018.

(30) Foreign Application Priority Data

Jul. 27, 2018    (CN) .......................... 201810838409.9

(51) Int. Cl.
  *G09G 5/00* (2006.01)
  *G06F 3/14* (2006.01)
(52) U.S. Cl.
  CPC .......... *G06F 3/1454* (2013.01); *G06F 3/1407* (2013.01); *G06F 3/1431* (2013.01)
(58) Field of Classification Search
  CPC .... G06F 3/0482; G06F 3/0485; G06F 40/279; G06F 1/3206; G06F 2111/02;
  (Continued)

(56) References Cited

U.S. PATENT DOCUMENTS 5,880,732 A * 3/1999 Tryding .................... G06F 3/14
                                                                    715/810
8,830,140 B2 * 9/2014 Lazzaro ................. G09G 5/003
                                                                    345/1.1
(Continued)

FOREIGN PATENT DOCUMENTS

CN          104182188 A        12/2014
CN          104951393 A         9/2015
(Continued)

OTHER PUBLICATIONS

International Patent Application No. PCT/CN2018/123651; Int'l Search Report; dated Apr. 30, 2019; 2 pages.

*Primary Examiner* — Duc Q Dinh
(74) *Attorney, Agent, or Firm* — BakerHostetler

(57) ABSTRACT

An image display method, an image display apparatus, an electronic device and a computer readable storage medium are provided. The image display method includes the following steps. A computer device sends a first display request to a terminal device, where the first display request is associated with display effect data. The terminal device receives the first display request from the computer device. The terminal device determines the display effect data according to the first display request. The terminal device sends a first display request acknowledgement message to the computer device, where the first display request acknowledgement message indicates that the terminal device successfully determines the display effect data. The terminal device displays an image according to the display effect data.

16 Claims, 5 Drawing Sheets

(58) Field of Classification Search
CPC ......... G06F 2203/04803; G06F 3/0304; G06F
3/048; G06F 3/1454; G06F 3/1407; G06F
3/1431; G06F 3/1462; G06F 11/0766;
G06F 11/30; G06F 11/3055; G06F
2009/45595; G06F 2221/2141; G06F
2221/2145; G06F 9/5077; G06F 3/1423;
G06F 15/16; G09G 5/003; G09G 5/18;
G09G 2320/0666; G09G 2320/08; G09G
2354/00; G09G 2320/06; G09G 2340/14;
G09G 2350/00; G09G 2370/025; G09G
2310/04; G09G 3/03; G09G 3/20; G09G
2370/16; G09G 2380/06; H04M 1/72552;
H04M 1/72547; H04M 1/0202; H04M
1/24; H04M 1/725; H04M 1/72522;
H04M 1/72572; H04M 2250/22; H04M
3/42382; H04N 21/4622; H04N 21/4627;
H04N 21/84; H04N 7/183; H04N 13/139;
H04N 21/4307; H04N 2201/3205; H04N
5/232; H04N 13/351; H04N 21/8547;
H04N 7/0122; H04W 4/18; H04W 4/50;
H04W 84/12; H04L 65/1069; H04L
12/287; H04L 63/101; H04L 43/08; H04L
43/0823; H04L 51/04

USPC ...................................... 345/3.1–2.3, 2.1–2.3
See application file for complete search history.

(56) References Cited

U.S. PATENT DOCUMENTS

| | | | |
|---|---|---|---|
| 10,121,449 B2* | 11/2018 | Kimn | .................... G06F 3/1454 |
| 2004/0183828 A1 | 9/2004 | Nichogi et al. | |
| 2015/0024720 A1 | 1/2015 | Efrati et al. | |
| 2015/0268830 A1* | 9/2015 | Martynov | ........... G06F 3/04842 |
| | | | 715/766 |

FOREIGN PATENT DOCUMENTS

| | | |
|---|---|---|
| CN | 106095362 A | 11/2016 |
| CN | 106294158 A | 1/2017 |
| CN | 106897967 A | 6/2017 |
| CN | 106990828 A | 7/2017 |
| CN | 107229560 A | 10/2017 |
| CN | 108280001 A | 7/2018 |

* cited by examiner

IMAGE DISPLAY METHOD, APPARATUS AND COMPUTER READABLE STORAGE MEDIUM

The present application is a continue application of PCT international Patent Application No. PCT/CN2018/123651, titled "IMAGE DISPLAY METHOD, APPARATUS, ELECTRONIC DEVICE AND COMPUTER READABLE STORAGE MEDIUM", filed on Dec. 25, 2018, which claims priority to Chinese Patent Application No. 201810838409.9, titled "IMAGE DISPLAY METHOD, APPARATUS, ELECTRONIC DEVICE AND COMPUTER READABLE STORAGE MEDIUM", filed on Jul. 27, 2018 with the Chinese Patent Office, both of which are incorporated herein by reference in their entireties.

FIELD

The present disclosure relates to the field of image processing, and in particular to an image display method, an image display apparatus, an electronic device and a computer readable storage medium.

BACKGROUND

With the development of the computer technology, applications of intelligent terminals are highly developed. For example, a user may browse webpages, listen to music, play games, and view photographs or videos through an intelligent terminal. When an image such as a photograph and a video is displayed by an intelligent terminal, in addition to high resolution, multiple display effects such as blurring effect, black-and-white effect, aging effect, bright effect, monochrome effect, aperture effect and skin care effect may be applied to the image displayed by the intelligent terminal.

Major intelligent terminal manufacturers and application vendors optimize display effects of images in order to attract consumers. Therefore, a mass of display effect data is configured to an intelligent terminal so that the intelligent terminal displays an image based on the display effect data and determines an optimal display effect through frequent adjustment. However, intelligent terminal are generally small in size and have limited storage and processing capacity. However, the frequent adjustment requires a large volume of display effect data. Therefore, the conventional technology of copying the display effect data to the intelligent terminal for adjustment will result in a low efficiency. Especially, to change the display effect data, new display effect data is required to be copied, which is not flexible.

SUMMARY

In a first aspect, an image display method is provided according to an embodiment of the present disclosure. The method includes: receiving a first display request from a computer device, where the first display request is associated with display effect data, determining the display effect data based on the first display request, and displaying an image based on the display effect data.

The image display method according to embodiments of the present disclosure may be implemented by a terminal device. With the image display method, the terminal device may receive display effect data at any time and display an image based on the display effect data, thereby configuring the display effect data for the image flexibly.

In an embodiment, the first display request carries the display effect data.

Alternatively, the first display request carries a display effect index. The determining the display effect data based on the first display request includes: determining the display effect data based on the display effect index.

In an embodiment, the receiving a first display request from a computer device includes: receiving the first display request via a port 8080.

In an embodiment, after the determining the display effect data based on the first display request, the method further includes: transmitting a first display request confirmation message to the computer device. For example, the first display request confirmation message indicates that the display effect data is successfully determined. For example, in a case that the display effect data is not determined, the first display request confirmation message may indicate that the display effect data is not successfully determined. Accordingly, the computer device may present whether the display effect data is successfully configured based on the first display request confirmation message.

In an embodiment, the displaying the image based on the display effect data includes: displaying, in response to a second display request received from the computer device, the image based on the display effect data. After the computer device receives the first display request confirmation message from the terminal device, it is determined that the terminal device configures the display effect data for the image successfully so that the computer device may transmit the second display request to the terminal device. The second display request instructs to display the image based on the display effect data. Therefore, after transmitting the first display request confirmation message to the computer device, the terminal device displays, in response to the second display request received from the computer device, the image based on the display effect data, thereby realizing good synchronization between the terminal device and the computer device.

In an embodiment, before the displaying an image based on the display effect data, the method further includes: capturing the image via an image sensor, or receiving the image from the computer device.

In an embodiment, the receiving a first display request from a computer device includes: receiving the first display request from the computer device via a wireless local area network.

In an embodiment, the computer device is a portable computer device or a desktop computer device.

In an embodiment, before the receiving a first display request from a computer device, the method further includes: establishing a local service. The receiving a first display request from a computer device includes: detecting the first display request through the local service. The determining the display effect data based on the first display request includes: determining the display effect data through the local service. After the determining the display effect data based on the first display request, the method further includes: generating a local notification message through the local service, where the local notification message includes the display effect data. After establishing the local service, the terminal device detects various massages transmitted by the computer device through the local service. For example, the terminal equipment detects the first display request and the second display request. After detecting the first display request, the local service determines the display effect data based on the first display request and generates the local notification message. The local notification message includes the display effect data so that the terminal device displays the image based on the local notification message.

For example, the terminal device globally broadcasts the local notification message through the local service. A local application of the terminal device acquires the display effect data after receiving the local notification message, so that the local application of the terminal device my display the image based on the display effect data.

In a second aspect, an image display apparatus is provided according to an embodiment of the present disclosure. The apparatus includes a receiving module, a determining module and a displaying module. The receiving module is configured to receive a first display request from a computer device. The first display request is associated with display effect data. The determining module is configured to determine the display effect data based on the first display request. The displaying module is configured to display an image based on the display effect data.

In an embodiment, the image display apparatus may be any forms of terminal devices. In an embodiment, the image display apparatus may also be implemented as software or a combination of software and hardware. The image display apparatus may be integrated in any forms of terminal devices. For example, the image display apparatus may be arranged in an image processing server or an image processing terminal device.

In an embodiment, the first display request carries the display effect data.

Alternatively, the first display request carries a display effect index. The determining module is configured to determine the display effect data based on the display effect index.

In an embodiment, the receiving module receives the first display request via a port 8080.

In an embodiment, the image display apparatus further includes a transmitting module. The transmitting module is configured to transmit a first display request confirmation message to the computer device after the display effect data is determined based on the first display request. For example, the first display request confirmation message indicates that the display effect data is successfully determined. For example, in a case that the display effect data is not determined, the first display request confirmation message may indicate that the display effect data is not successfully determined. Accordingly, the computer device may present whether the display effect data is successfully configured based on the first display request confirmation message.

In an embodiment, the displaying module is configured to display, in response to a second display request received by the receiving module from the computer device, the image based on the display effect data. After the computer device receives the first display request confirmation message from the image display apparatus, it is determined that the image display apparatus configures the display effect data for the image successfully so that the computer device may transmit the second display request to the image display apparatus. The second display request instructs to display the image based on the display effect data. Therefore, after transmitting the first display request confirmation message to the computer device, the image display apparatus displays, in response to the second display request received from the computer device, the image based on the display effect data, thereby realizing good synchronization between the image display apparatus and the computer device.

In an embodiment, the image display apparatus further includes an image acquiring module. The image acquiring module is configured to acquire the image via an image sensor. Alternatively, the receiving module is further configured to receive the image from the computer device.

In an embodiment, the receiving module is configured to receive the first display request from the computer device via a wireless local area network.

In an embodiment, the computer device is a portable computer device or a desktop computer device.

In an embodiment, the image display apparatus further includes a local service establishing module. The local service establishing module is configured to establish a local service. The receiving module detects the first display request through the local service. The determining module determines the display effect data through the local service. The image display apparatus further includes a local notification module. The local notification module is configured to generate a local notification message through the local service, where the local notification message includes the display effect data. After establishing the local service, the image display apparatus detects various massages transmitted by the computer device through the local service. For example, the image display apparatus detects the first display request and the second display request. After detecting the first display request, the image display apparatus determines the effect display data through the local service and generates the local notification message. The local notification message includes the display effect data so that the image display apparatus displays the image based on the local notification message. For example, the image display apparatus globally broadcasts the local notification message through the local service. A local application of the image display apparatus acquires the display effect data after receiving the local notification message, so as to display the image based on the display effect data.

In a third aspect, an electronic device is provided according to an embodiment of the present disclosure. The electronic device includes at least one processor and a memory in communication with the at least one processor. The memory stores computer instructions that when being executed by the at least one processor, cause the electronic device to perform any image display method according to the first aspect of the present disclosure.

In a fourth aspect, a non-transitory computer readable storage medium is provided according to an embodiment of the present disclosure. The non-transitory computer readable storage medium stores computer instructions that when being executed by a computing device, cause the computing device to perform any image display method according to the first aspect of the present disclosure.

In a fifth aspect, an image display system is provided according to an embodiment of the present disclosure. The image display system includes a terminal device and a computer device. The terminal device may be the image display apparatus according to the second aspect of the present disclosure, the electronic device according to the third aspect of the present disclosure or a computing device including the non-transitory computer readable storage medium according to the fourth aspect of the present disclosure. The terminal device receives a first display request from the computer device, determines display effect data based on the first display request and displays an image based on the display effect data. The terminal device in the image display system may further configured to perform any image display method according to the first aspect of the present disclosure.

The above description is merely an overview of technical solutions in the present disclosure. In order to make technique means of the present disclosure more clear so as to be implemented according to the present disclosure, and make the above and other purposes, features and advantages better understood, preferred embodiments are described in detail below in conjunction with drawings.

BRIEF DESCRIPTION OF THE DRAWINGS

In order to more clearly describe the technical solutions in the embodiments of the present disclosure or the conventional technology, drawings to be used in the description of the embodiments of the present disclosure or the conventional technology are briefly described hereinafter. It is apparent that the drawings described below merely show some embodiments of the present disclosure, and those skilled in the art may obtain other drawings according to the provided drawings without any creative effort.

DETAILED DESCRIPTION OF EMBODIMENTS

Embodiments of the present disclosure are described with specific examples hereinafter and those skilled in the art may easily learn about other advantages and uses of the present disclosure from details disclosed in the present specification. Apparently, embodiments described below are merely some, rather than all of embodiments according to the present disclosure. The present disclosure may be implemented or applied in other different embodiments. For different applications, details in the present specification may be modified or changed without departing from the spirit of the present disclosure. It is noted that, embodiments below and features in the embodiments may be in combination with each other as long as there is no conflict. Based on embodiments of the present disclosure, all other embodiments obtained by those skilled in the art without creative efforts belong to the scope of the present disclosure.

It is noted that below describes various aspects of embodiments in the scope of the attached claims. Apparently, the various aspects described herein may be implemented in various forms, and any specific structures and/or functions described herein are only illustrative. According to the present disclosure, those skilled in the art should know that any aspects described herein may be implemented independently from other aspects or may be implemented in combination with one or more other aspects in various ways. For example, a device and/or method may be implemented by using any number of aspects of the present specification. In addition, other structures and/or functions than one or more aspects of the present disclosure may be used to implement the device and/or method.

It is noted that, the drawings provided in the following embodiments are merely used to schematically explain basic concept of the present disclosure. The drawings only show elements relating to the present disclosure and are not drawn according to actual number, shape and size of the elements. The shape, number and scale of each element in practical implementations may be changed arbitrarily and the configuration of the elements may be more complex.

Moreover, in the following description, specific details are provided for better understanding of the embodiments. However, those skilled in the art should know that the aspects of the present disclosure may be implemented without the specific details.

Figure 1:
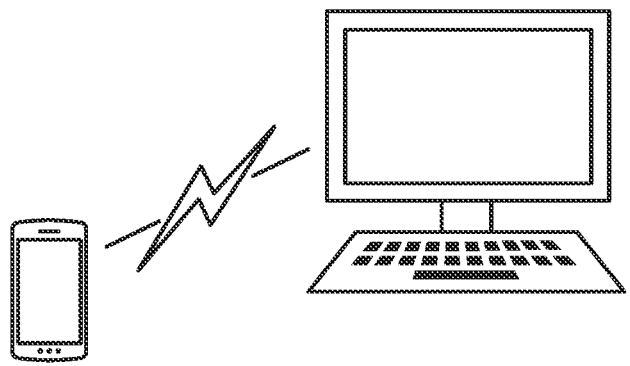
FIG. 1 is a schematic diagram of an implementation environment according to an embodiment of the present disclosure.

FIG. 1 is a schematic diagram of an implementation environment according to an embodiment of the present disclosure. The implementation environment in FIG. 1 includes a terminal device and a computer device. The terminal device is in communication with the computer device. The communication may be achieved via a wireless connection or a wired connection. For example, the terminal device is connected to the computer device via a wireless local area network, the Bluetooth technology, the NFC (near field communication) technology or the like.

It should be noted that, some embodiments of the present disclosure are described by using the example of the terminal device and the computer device, but those skilled in the art should understand that the terminal device and the computer device may be other entities and/or software that can perform corresponding functions. In an embodiment, the computer device may be a portable computer device or a desktop computer device. In an embodiment, the terminal device may be any types of devices with a display function, such as an intelligent telephone.

Figure 2:
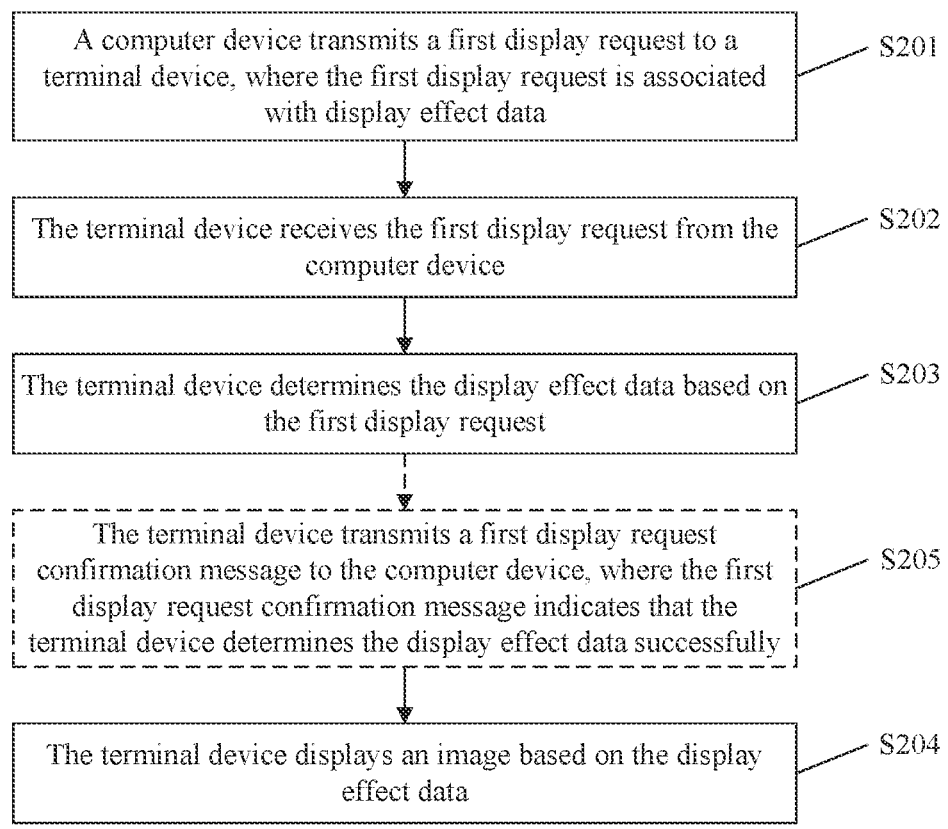
FIG. 2 is a flowchart of an image display method according to a first embodiment of the present disclosure.

FIG. 2 is a flowchart of an image display method according to a first embodiment of the present disclosure. The first embodiment of the image display method may be applied to the implementation environment shown in FIG. 1. As shown in FIG. 2, the image display method includes steps S201 to S204.

In step S201, a computer device transmits a first display request to a terminal device. The first display request is associated with display effect data.

In step S202, the terminal device receives the first display request from the computer device.

In step S203, the terminal device determines the display effect data based on the first display request.

In step S204, the terminal device displays an image based on the display effect data.

Since the terminal device is in communication with the computer device, the terminal device can receive the first display request from the computer device in step S201 and step S202.

In an optional embodiment, the first display request carries the display effect data so that the display effect data can be transmitted to the terminal device by the computer device. Accordingly, after receiving the first display request, the terminal device can determine the display effect data. For example, the display effect data carried in the first display request is compressed data so as to save communication traffic.

In another optional embodiment, the first display request carries a display effect index. After receiving the display effect index in step S202, the terminal device can determine the display effect data based on the display effect index in step S203. For example, the terminal device stores a correspondence between the display effect index and the display effect data. The computer device transmits the display effect index to the terminal device. Accordingly, after acquiring the display effect index by receiving the first display request, the terminal device may determine the display effect data corresponding to the acquired display effect index by looking up the correspondence. In this way, the computer device is not required to transmit mass of display effect data, thereby saving communication traffic. In an embodiment, the terminal device may store the correspondence between the display effect index and the display effect data in a form of a look-up table.

By performing the above steps S201 to S203, in a process of adjusting a display effect of an image displayed by the terminal device, the display effect data can be transmitted to the terminal device via the computer device directly or indirectly at any time. By performing the above step S204, the terminal device can display the image based on the determined display effect data so that intelligent terminal manufacturers and application vendors can adjust the display effect of the image displayed by the terminal device efficiently and flexibly.

It should be noted that the display effect data is not limited in embodiments of the present disclosure. Those skilled in the art may understand that the display effect data may be any forms of data used for configure a display effect of an image. The display effect data includes but is not limited to blur data, grayscale data, color data, gradation data, black-and-white effect data, aging effect data, bright effect data, aperture effect data, skin care effect data and the like.

In an embodiment, the image may be captured by the terminal device via an image sensor, may be received from the computer device, or may be pre-stored. For example, the display effect data determined by the terminal device in step S203 is grayscale data. An image pre-stored in the terminal device may have original grayscale data or have no grayscale data. In step S204, the terminal device displays the pre-stored image based on the grayscale data determined in step S203, rather than grayscale data of the pre-stored image. It should be noted that the image in embodiments of the present disclosure is a general concept. For example, as a video consists of a number of image frames, the image in the embodiments of the present disclosure includes a video. The image display method according to the present disclosure can also be used to display a video.

In an optional embodiment, after step S203, that is, after the terminal device determines the display effect data based on the first display request, the image display method further includes step S205.

In step S205, the terminal device transmits a first display request confirmation message to the computer device. The first display request confirmation message indicates that the terminal device determines the display effect data successfully.

In the process of adjusting the display effect of an image displayed by the terminal device, after the computer device transmits the display effect data to the terminal device directly or indirectly, the terminal device transmits the first display request confirmation message to the computer device in step S205 if the terminal device determines the display effect data successfully. Apparently, if the terminal device fails to determine the display effect data, the terminal device may transmit a first display request confirmation message indicating that the display effect data is not determined successfully, to the computer device. In this way, the computer device can acquire whether the terminal device determines the display effect data successfully, and thus the computer device may prompt, via a display screen, a person adjusting the image display effect. In a typical application, the terminal device transmits the confirmation message through a call-back to inform the computer device of a processing result regarding the first display request. The call-back is transmitted in an asynchronous manner so as to prevent blocking of the network of the computer device.

In another optional embodiment, the computer device displays the image based on the display effect data in response to a second display request received from the computer device. After determining the display effect data, the terminal device detects the second display request from the computer device. After receiving the second display request, the terminal device displays the image based on the display effect data. That is, the terminal device displays the image in response to the second display request transmitted by the computer device, so that the person adjusting the image display effect controls, via the computer device, the timing of displaying the image based on the display effect data by the terminal device, which improves the efficiency of image display effect adjustment.

Figure 3:
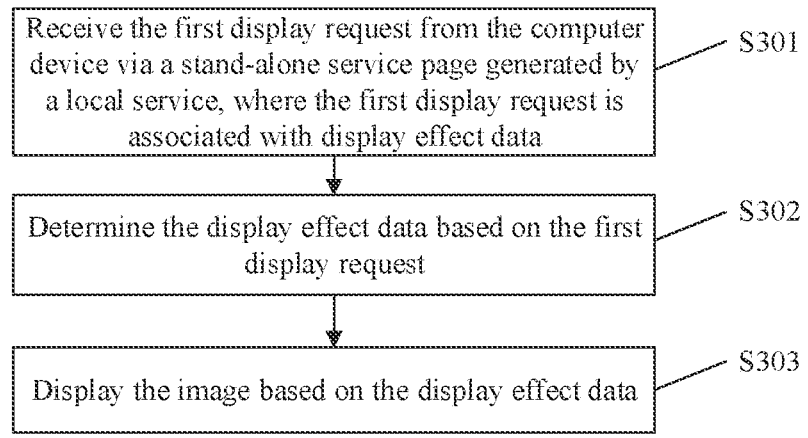
FIG. 3 is a flowchart of an image display method according to a second embodiment of the present disclosure.

FIG. 3 is a flowchart of an image display method according to a second embodiment in the present disclosure. As shown in FIG. 3, the image display method includes steps S301 to S303.

In step S301, a first display request is received from a computer device. The first display request is associated with display effect data.

In step S302, the display effect data is determined based on the first display request.

In step S303, an image is displayed based on the display effect data.

It should be noted that steps S301 to S303 are similar to steps S202 to S204, therefore, for similar or same contents, one may refer to descriptions of steps in FIG. 2, which are not repeated herein. The image display method shown in FIG. 3 may be performed by an image display apparatus. The image display apparatus may be implemented as software or a combination of software and hardware. For example, the image display apparatus may be a terminal device or integrated in a device. For example, the image display apparatus may be integrated in an image processing server or an image processing terminal device.

In an optional embodiment, the image display apparatus establishes a local service and performs steps S301 and S302 through the local service. The local service may be implemented through a computer program, process or thread, but is not limited thereto. For example, the local service follows the http protocol and opens a stand-alone service page. The service page corresponds to multiple API interfaces and provides a human-computer interaction interface for the API interfaces. The first display request is received from the computer device via the stand-alone service page. Accordingly, the computer device can access the stand-alone service page and input display effect data or a display effect index through the stand-alone service page. The inputting the display effect data may be adding the display data, deleting the display data or modifying the display data. A display effect may be inquired using the display effect index so as to perform step S301, that is, the first display request is transmitted to the image display apparatus directly or indirectly. In an embodiment, after the local service is established, the image display method further includes registering an implementation method of an interface. Before the local service is started, it is required to configure how an interface operates, for example, how to parse data in the display request and how to process the data after the display request is received via an upload interface of the image display apparatus. In an embodiment, the image display apparatus receives the first display request from the computer device via a port 8080. In step S302, after determining the display effect data through the local service, the image display apparatus further generates a local notification message through the local service. The local notification message includes the display effect data. In an embodiment, the local service broadcasts the local notification message via a notification center. The image display apparatus displays the image based on the display effect data in the local notification message. For example, a local application used for displaying the image displays, in response to the received local notification message, the image based on the display effect data in the local notification message.

Figure 4:
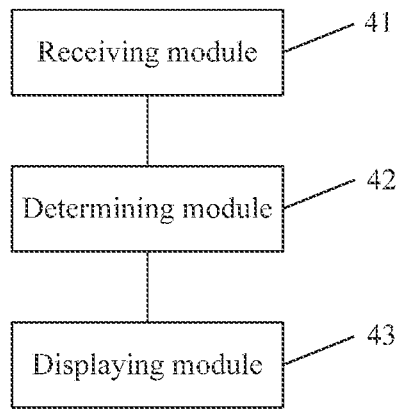
FIG. 4 is a schematic structural diagram of an image display apparatus according to an embodiment of the present disclosure.

FIG. 4 is a schematic structural diagram of an image display apparatus according to an embodiment of the present disclosure. As shown in FIG. 4, the apparatus includes a receiving module 41, a determining module 42 and a displaying module 43.

The receiving module 41 is configured to receive a first display request from a computer device. The first display request is associated with display effect data.

The determining module 42 is configured to determine the display effect data based on the first display request.

The displaying module 43 is configured to display an image based on the display effect data.

The apparatus shown in FIG. 4 may perform the method according to the embodiment shown in FIG. 2 or FIG. 3. For parts not described in detail in this embodiment, one may refer to relevant descriptions of the embodiment shown in FIG. 2 or FIG. 3. For the process and technical effects of the technical solution, one may refer to descriptions of the embodiment shown in FIG. 2 or FIG. 3, which are not repeated herein.

In an optional embodiment, the image display apparatus further includes a transmitting module. The transmitting module is configured to transmit a first display request confirmation message to the computer device after the display effect data is determined based on the first display request.

In another optional embodiment, the image display apparatus further includes an image acquiring module. The image acquiring module is configured to acquire the image via an image sensor. Alternatively, the receiving module is further configured to receive the image from the computer device.

In another optional embodiment, the image display apparatus further includes a local service establishing module. The local service establishing module is configured to establish a local service to realize functions of the local service in the embodiment shown in FIG. 3.

Figure 5:
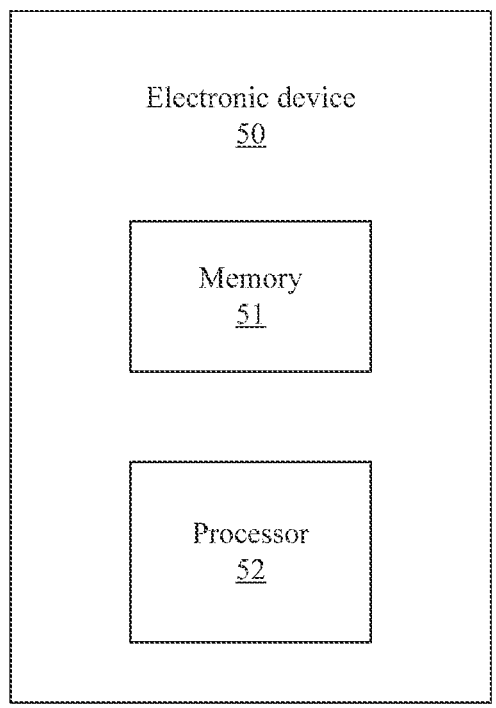
FIG. 5 is a schematic structural diagram of an electronic device according to an embodiment of the present disclosure.

FIG. 5 is a hardware block diagram of an electronic device according to an embodiment of the present disclosure. As shown in FIG. 5, the electronic device 50 according to an embodiment of the present disclosure includes a memory 51 and at least one processor 52.

The memory 51 is configured to store non-transitory computer readable instructions. Specifically, the memory 51 may include one or more computer program products. The computer program products may include various forms of computer readable storage medium, such as a volatile memory and/or a nonvolatile memory. The volatile memory may include a random access memory (RAM) and/or a cache memory (cache), and the like. The nonvolatile memory may include a read-only memory (ROM), a hard disk, a flash memory, and the like.

The at least one processor 52 may be a central processing unit (CPU) or another type of processing unit with data processing capacity and/or instruction execution capacity. The processor 52 can control other modules in the electronic device 50 to execute desired functions. In an embodiment of the present disclosure, the processor 52 is configured to execute the computer readable instructions stored in the memory 51 to control the electronic device 50 to execute some or all steps of the image display method according to aforementioned embodiments of the present disclosure.

Those skilled in the art should understand that well-known structures such as a communication bus and an interface may be included in some embodiments to provide good user experience and the well-known structures also fall within the scope of the present disclosure.

For a detailed description of the present embodiment, one may refer to relevant descriptions of the aforementioned embodiments, which are not repeated herein.

Figure 6:
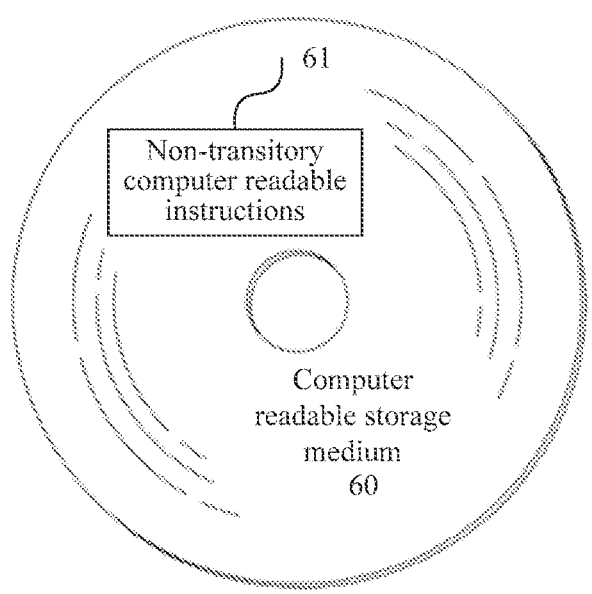
FIG. 6 is a schematic structural diagram of a computer readable storage medium according to an embodiment of the present disclosure.

FIG. 6 is a schematic diagram of a computer readable storage medium according to an embodiment of the present disclosure. As shown in FIG. 6, non-transitory computer readable instructions 61 are stored in a computer readable storage medium 60 according to an embodiment of the present disclosure. Some or all steps of the image display method according to aforementioned embodiments of the present disclosure are executed when the non-transitory computer readable instructions 61 are executed by a processor.

The computer readable storage medium 60 includes but is not limited to an optical storage medium (such as CD-ROM and DVD), a magneto-optical storage medium (such as MO), a magnetic storage medium (such as a tape and a movable hard disk), a medium with an inbuilt rewritable nonvolatile memory (such as a memory card), and a medium with an inbuilt ROM (such as a ROM box).

For a detailed description of the present embodiment, one may refer to relevant descriptions of the aforementioned embodiments, which are not repeated herein.

Figure 7:
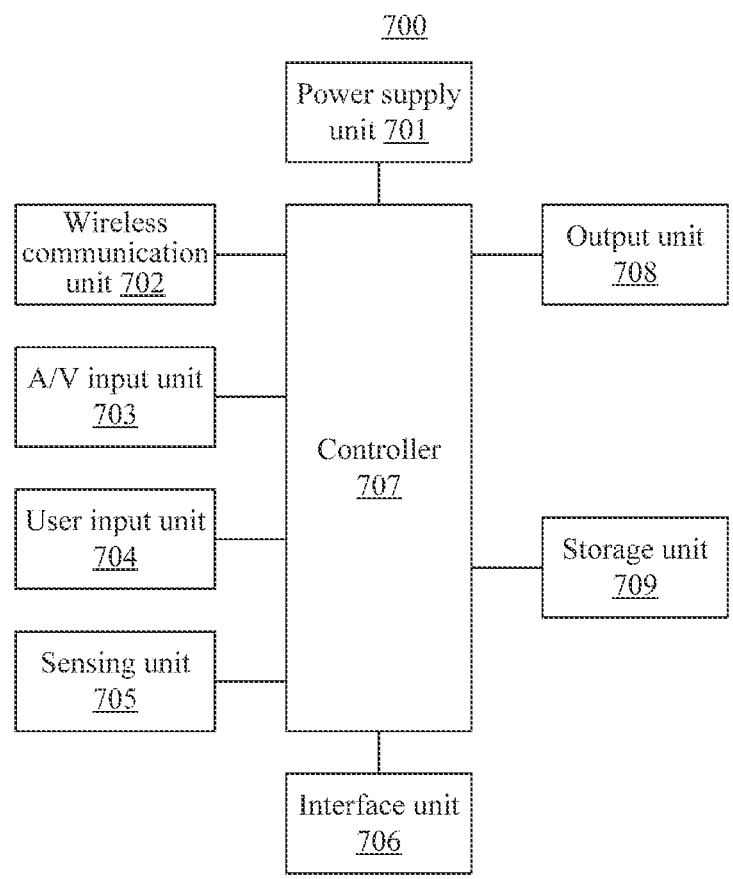
FIG. 7 is a schematic structural diagram of an image display terminal device according to an embodiment of the present disclosure.

FIG. 7 is a schematic hardware structural diagram of a terminal device according to an embodiment of the present disclosure. As shown in FIG. 7, the terminal device 700 includes the image display apparatus according to the above embodiments.

The terminal device may be implemented in various forms. The terminal device according to the present disclosure includes but is not limited to mobile terminal devices such as a mobile phone, a smart phone, a laptop computer, a digital broadcast receiver, a PDA (personal digital assistant), a PAD (tablet computer), a PMP (portable multimedia player), a navigation apparatus, a vehicle terminal device, a vehicle display terminal, and a vehicle electronic rearview mirror, and fixed terminal devices such as a digital TV and a desktop computer.

As alternatives of the above embodiments, the terminal may also include other elements. As shown in FIG. 7, the terminal device 700 may include a power supply unit 701, a wireless communication unit 702, an A/V (audio/video) input unit 703, a user input unit 704, a sensing unit 705, an interface unit 706, a controller 707, an output unit 708, a storage unit 709, and the like. FIG. 7 shows a terminal with various modules, but it should be understood that not all shown modules are necessary, and more or less modules may be implemented alternatively.

The wireless communication unit 702 allows wireless communication between the terminal 700 and a wireless communication system or network. The A/V input unit 703 is configured to receive an audio signal or a video signal.

The user input unit 704 may generate key input data based on a command inputted by a user, to control various operations of the terminal device. The sensing unit 705 is configured to detect a current state of the terminal 700, a location of the terminal 700, presentence of a touch input of a user to the terminal 700, the orientation of the terminal 700, accelerated or decelerated movement of the terminal 700, and a direction of movement of the terminal 700, and generate a command or a signal for controlling the operation of the terminal 700. The interface unit 706 is configured to connect at least one external apparatus to the terminal 700. The output unit 708 is configured to output a signal in a visual, audio and/or tactile way. The storage unit 709 may store software programs of processes and controlling operations executed by the controller 707, or temporarily store data to be outputted or data already outputted. The storage unit 709 may include at least one type of storage medium. Furthermore, the terminal 700 may collaborate with a network memory apparatus executing the storage function of the storage unit 709 via a network connection. The controller 707 usually controls overall operations of the terminal device. In addition, the controller 707 may include a multimedia module configured to reproduce or playback multimedia data. The controller 707 may execute pattern recognition processing to recognize handwriting input or picture drawing input on a touch screen as a character or an image. Under the control of the controller 707, the power supply unit 701 receives external electric power or internal electric power and supplies proper electric power required for operating various elements and modules.

The embodiments of the image display method according to the present disclosure may be implemented by computer software, computer hardware or any combination thereof in a form of computer readable medium. For hardware implementation, the embodiments of the image display method according to the present disclosure may be implemented by one of an application specific integrated circuit (ASIC), a digital signal processor (DSP), a digital signal processing device (DSPD), a programmable logic device (PLD), a field programmable gate array (FPGA), a processor, a controller, a microcontroller, and a microprocessor which are designed to execute at least one of functional electronic units described above. In some cases, the embodiments of the image display method according to the present disclosure may be implemented by the controller 707. For software implement, the embodiments of the image display method according to the present disclosure may be implemented by a separate software module designed to execute at least one function or operation. Software code may be implemented as software application programs (or programs) written in any proper program language. The software code may be stored in the storage unit 709 and executed by the controller 707.

For a detailed description of the present embodiment, one may refer to relevant descriptions of the aforementioned embodiments, which are not repeated herein.

General principles of the present disclosure are described in conjunction with specific embodiments. However, it should be noted that advantages, superiorities and effects mentioned in the present disclosure are only examples rather than restrictions. Each embodiment of the present disclosure may not necessarily have the advantages, superiorities and effects. In addition, specific details disclosed above are not restrictive but merely exemplary and illustrative for better understanding. The present disclosure is not limited to the above specific details.

Block diagrams of devices, apparatuses, equipment, and systems according to the present disclosure are merely examples, which do not indicate or imply that connections, arrangements and configurations must be in the way shown in the block diagrams. As understood by those skilled in the art, these devices, apparatuses, equipment, and systems may be connected, arranged and configured in any way. Words such as "include", "comprise", "have", and the like are inclusive, which indicate "including but not limited to" and may be used interchangeably. Words "or" and "and" herein refer to "and/or", and may be used interchangeably, unless it is explicitly indicated otherwise by the context. Words "such as" refers to "such as but not limited to", which may be used interchangeably.

Besides, when the word "or" is used between listed elements after the phrase "at least one", it indicates all possible combinations. For example, "at least one of A, B or C" means A or B or C, or AB or AC or BC, or ABC (i.e., A and B and C). Furthermore, the expression "example" doesn't mean that the described example is preferable or better than other examples.

It is noted that various units or various steps in the systems or methods of the present disclosure may be decomposed and/or recombined. These decomposition and recombination should be regarded as equivalent technical solutions of the present disclosure.

Variations, replacements and changes may be made to the described technical solutions without departing from the technical scope defined by the attached claims. In addition, the scope of the claims of the present disclosure is not limited to specific details of components, means, methods and actions of the above processes, machines, manufactures and events. One may use components, means, methods and actions of processes, machines, manufactures and events that already or that will in future have similar functions or achieve similar effects as those described above. Therefore, the attached claims cover such components, means, methods and actions of the processes, machines, manufactures and events in the scope.

The above description of the aspects of the present disclosure is provided to make those skilled in the art can implement or use the technical solutions. Various modifications on these aspects are apparent for those skilled in the art. General principles defined herein may be applied to other aspects without departing from the scope of the present disclosure. Therefore, the present disclosure is not limited to the aspects described herein, but should comply with the widest scope consistent with the principles and novel features disclosed herein.

The above description is provided for illustration, rather than limiting embodiments of the technical solutions to the disclosed embodiments. Although multiple examples and embodiments are discussed above, those skilled in the art may make some variations, modifications, changes, additions and sub-combinations.

The invention claimed is:

1. A method of displaying an image based on display effect data at a terminal device, comprising:
    establishing, at the terminal device, a local service;
    generating, at the terminal device, a stand-alone service page by the local service;
    receiving, at the terminal device via the stand-alone service page, a first display request from a computer device, wherein the first display request is associated with the display effect data, the display effect data comprise data associated with the image to be displayed by the terminal device and configuring display effects of the image to be displayed by the terminal device, and the display effect data comprise at least one of blur data, grayscale data, color data, gradation data, black and white effect data, aging effect data, bright effect data, aperture effect data, or skin care effect data;

determining the display effect data based on the first display request by the local service of the terminal device;

transmitting a first display request confirmation message to the computer device, wherein the first display request confirmation message indicates that the display effect data is successfully determined;

displaying, at the terminal device, the image based on the display effect data;

wherein the image display method further comprises:

generating a local notification message through the local service of the terminal device, wherein the local notification message comprises the display effect data; and displaying the image based on the display effect data comprised in the local notification message so as to efficiently and flexibly adjust the display effects of the image displayed by the terminal device.

2. The image display method according to claim 1, wherein the first display request carries the display effect data.

3. The image display method according to claim 1, wherein the first display request carries a display effect index, and the determining the display effect data based on the first display request comprises:

determining the display effect data based on the display effect index.

4. The image display method according to claim 1, wherein the displaying the image based on the display effect data comprises:

displaying, in response to a second display request received from the computer device, the image based on the display effect data.

5. The image display method according to claim 1, wherein before the displaying the image based on the display effect data, the method further comprises:

capturing the image via an image sensor; or receiving the image from the computer device.

6. The image display method according to claim 1, wherein the receiving a first display request from a computer device comprises:

receiving the first display request from the computer device via a wireless local area network.

7. The image display method according to claim 1, wherein the computer device is a portable computer device or a desktop computer device.

8. An apparatus of displaying an image based on display effect data at a terminal device, comprising:

at least one processor; and at least one memory communicatively coupled to the at least one processor and storing instructions that upon execution by the at least one processor cause the apparatus to:

establish, at the terminal device, a local service;

generate, at the terminal device, a stand-alone service page by the local service;

receive a first display request from a computer device via the stand-alone service page, wherein the first display request is associated with the display effect data, the display effect data comprise data associated with the image to be displayed by the terminal device and configuring display effects of the image to be displayed by the terminal device, and the display effect data comprise at least one of blur data, grayscale data, color data, gradation data, black and white effect data, aging effect data, bright effect data, aperture effect data, or skin care effect data;

determine the display effect data based on the first display request by the local service of the terminal device;

transmit a first display request confirmation message to the computer device, wherein the first display request confirmation message indicates that the display effect data is successfully determined;

display, at the terminal device, the image based on the display effect data;

wherein the at least one memory further storing instructions that upon execution by the at least one processor cause the apparatus to:

generate a local notification message through the local service of the terminal device, wherein the local notification message comprises the display effect data; and display the image based on the display effect data comprised in the local notification message so as to efficiently and flexibly adjust the display effects of the image displayed by the terminal device.

9. The apparatus of claim 8, wherein the first display request carries the display effect data.

10. The apparatus of claim 8, wherein the at least one memory further storing instructions that upon execution by the at least one processor cause the apparatus to:

determine the display effect data based on the display effect index.

11. The apparatus of claim 8, wherein the at least one memory further storing instructions that upon execution by the at least one processor cause the apparatus to:

display, in response to a second display request received from the computer device, the image based on the display effect data.

12. The apparatus of claim 8, wherein the at least one memory further storing instructions that upon execution by the at least one processor cause the apparatus to:

capture the image via an image sensor; or receive the image from the computer device.

13. The apparatus of claim 8, wherein the at least one memory further storing instructions that upon execution by the at least one processor cause the apparatus to:

receive the first display request from the computer device via a wireless local area network.

14. The apparatus of claim 8, wherein the computer device is a portable computer device or a desktop computer device.

15. A non-transitory computer readable storage medium of displaying an image based on display effect data at a terminal device, storing computer instructions that when being executed by a processor, cause the processor at least to:

establish, at the terminal device, a local service;

generate, at the terminal device, a stand-alone service page by the local service;

receive a first display request from another computer device via the stand-alone service page, wherein the first display request is associated with the display effect data, the display effect data comprise data associated with the image to be displayed by the terminal device and configuring display effects of the image to be displayed by the terminal device, and the display effect data comprise at least one of blur data, grayscale data, color data, gradation data, black and white effect data, aging effect data, bright effect data, aperture effect data, or skin care effect data;

determine the display effect data based on the first display request by the local service of the terminal device;

transmit a first display request confirmation message to the computer device, wherein the first display request confirmation message indicates that the display effect data is successfully determined;

display, at the terminal device, the image based on the display effect data;

wherein the non-transitory computer readable storage medium further stores computer instructions that upon execution by the computing device cause the computing device to:

generate a local notification message through the local service of the terminal device, wherein the local notification message comprises the display effect data; and display the image based on the display effect data comprised in the local notification message so as to efficiently and flexibly adjust the display effects of the image displayed by the terminal device.

16. The non-transitory computer-readable non-transitory storage medium of 15, wherein the first display request carries the display effect data.

\* \* \* \* \*